United States Patent
Kim et al.

(10) Patent No.: US 8,447,451 B2
(45) Date of Patent: May 21, 2013

(54) SYSTEM AND METHOD FOR CONTROLLING OPERATION OF AN ELECTRIC ALL-WHEEL DRIVE HYBRID VEHICLE

(75) Inventors: Min-Joong Kim, Troy, MI (US); Shawn H. Swales, Canton, MI (US); Norman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 228 days.

(21) Appl. No.: 13/092,183

(22) Filed: Apr. 22, 2011

(65) Prior Publication Data

US 2012/0271494 A1    Oct. 25, 2012

(51) Int. Cl.
*B60W 20/00* (2006.01)
*B60W 10/08* (2006.01)

(52) U.S. Cl.
USPC ................ 701/22; 180/65.265; 180/65.275

(58) Field of Classification Search
USPC ................ 701/22, 69, 29.1, 34.4; 180/65.1, 180/65.21, 65.265, 65.275, 65.28, 65.285, 180/65.6, 65.7
See application file for complete search history.

(56) References Cited

U.S. PATENT DOCUMENTS

| | | | | |
|---|---|---|---|---|
| 8,302,720 B2* | 11/2012 | Rose et al. | | 180/167 |
| 2008/0004780 A1* | 1/2008 | Watanabe et al. | | 701/54 |
| 2009/0018715 A1* | 1/2009 | Kanayama | | 701/22 |
| 2009/0150035 A1* | 6/2009 | Soliman et al. | | 701/54 |
| 2011/0029177 A1* | 2/2011 | Yeung et al. | | 701/22 |

* cited by examiner

*Primary Examiner* — Mary Cheung
*Assistant Examiner* — Rodney Butler
(74) *Attorney, Agent, or Firm* — Quinn Law Group, PLLC

(57) ABSTRACT

A method of controlling operation of an electric all-wheel drive hybrid vehicle having an engine, automatic transmission, and first and second motor-generators includes driving the vehicle via the second motor-generator. The method also includes determining desired engine speed and transmission gear ratio. The method also includes starting the engine via the first motor-generator and locking up all but one of a plurality of transmission torque transmitting devices required to be engaged for selecting the gear ratio. The method additionally includes modulating engagement of the one remaining torque transmitting device while controlling the engine to generate the desired engine speed. Furthermore, the method includes regulating the engine and the first motor-generator such that their combined torque is approximately zero, locking up the remaining torque transmitting device to select the gear ratio, and controlling the engine to generate desired transmission output torque. A system for controlling such a vehicle is also disclosed.

20 Claims, 3 Drawing Sheets

SYSTEM AND METHOD FOR CONTROLLING OPERATION OF AN ELECTRIC ALL-WHEEL DRIVE HYBRID VEHICLE

TECHNICAL FIELD

The invention relates to a system and a method for controlling operation of an electric all-wheel drive hybrid vehicle.

BACKGROUND

Modern vehicles are typically configured as either two- or all-wheel drive. Either type of a vehicle may employ a conventional powertrain, where a single engine is used to propel the vehicle, or a hybrid powertrain, where two or more distinct power sources, such as an internal combustion engine and an electric motor, are used to accomplish the same task. Furthermore, a multi-speed automatically-shiftable transmission may be employed as part of either type of a powertrain, and may thus be used in a hybrid vehicle with all-wheel drive.

In order to maximize fuel efficiency of a hybrid powertrain, the vehicle's engine may be shut off when engine torque is not required for driving the vehicle. Such a situation may be encountered when the hybrid vehicle is maintaining a steady cruising speed, is in a coast down mode, i.e., when the vehicle is decelerating from elevated speeds, or is stopped.

An all-wheel drive hybrid vehicle may be configured as an axle-split vehicle. In such a vehicle, an electric motor is set up to power one vehicle axle and the engine is configured to power the vehicle's remaining axle(s), thus generating an on demand electric all-wheel drive. In such an axle-split hybrid vehicle, the electric motor may be capable of propelling the vehicle while the transmission is in neutral and the engine is shut off. However, in the event the engine needs to be restarted to participate in driving such a vehicle, the resumed application of engine torque through the transmission while the vehicle is in motion may generate an unwanted driveline disturbance.

SUMMARY

A method of controlling operation of an electric all-wheel drive hybrid vehicle is provided. The subject vehicle includes an engine configured to drive the vehicle via a first set of wheels through an automatic transmission, a first motor-generator configured to start the engine, and a second motor-generator configured to drive the vehicle via a second set of wheels. The method includes driving the vehicle in an "electric vehicle" or EV mode while the engine is off. As employed herein, the EV mode is a mode where the vehicle is powered solely via the second motor-generator while the engine is shut off and the transmission is in neutral, such that the engine is operatively disconnected from the first set of wheels.

The method also includes receiving a request for the engine to be started for generating a desired level of transmission output torque, and determining a desired engine speed and a gear ratio in the transmission according to the desired level of transmission output torque. The method also includes starting the engine via the first motor-generator for generating the desired level of transmission output torque. The method additionally includes locking up or fully engaging all but one of a plurality of transmission torque transmitting devices required to be engaged for selecting the transmission gear ratio.

The method additionally includes modulating the engagement of the one remaining torque transmitting device such that a torque capacity of the one remaining torque transmitting device is gradually increased. The method also includes controlling the engine to generate the desired engine speed while the engagement of the one remaining torque transmitting device is being modulated. In addition, the method includes regulating the engine and the first motor-generator such that combined torque input from the engine and the first motor-generator to the transmission is approximately zero. Also, the method includes locking up the one remaining torque transmitting device to select the gear ratio. Furthermore, the method includes controlling the engine to generate the desired level of transmission output torque.

According to the method, the first motor-generator may be configured as one of an integrated starter-generator (ISG) and a 12 volt stop-start motor.

The act of controlling the engine to generate the desired engine speed may be accomplished by controlling engine torque via at least one of regulating engine fuel rate, retarding engine spark, and regulating the torque of the first motor-generator.

Additionally, the act of controlling the engine to generate the desired level of transmission output torque may be accomplished via at least one of regulating engine fuel rate, advancing engine spark, and regulating the torque of the first motor-generator.

The desired level of transmission output torque may be determined according to whether the vehicle is to be driven in an electric all-wheel drive mode or an engine-only drive mode. Consequently, the act of controlling the engine to generate the desired level of transmission output torque may be accomplished for driving the vehicle in the electric all-wheel drive mode or in the engine-only drive mode.

The method may also include phasing out the second motor-generator while the engine is being controlled to generate the desired level of transmission output torque in the engine-only drive mode. The vehicle may include an energy storage device configured to supply energy to the second motor-generator. In such a case, the act of phasing out the second motor-generator may be accomplished when the energy supplied to the second motor-generator by the energy storage device is below a predetermined value.

The vehicle may include a controller. Such a controller may be configured to receive the request for the engine to be started for generating a desired level of transmission output torque. Additionally, the controller may be programmed to execute each of said determining the desired engine speed and the gear ratio in the transmission, starting the engine via the first motor-generator, fully engaging all but one of a plurality of torque transmitting devices, modulating the engagement of the remaining one torque transmitting device, controlling engine torque to generate the desired engine speed, locking up the remaining torque transmitting device, controlling the engine to generate the desired level of transmission output torque, and phasing out the second motor-generator.

The vehicle may include a single fluid pump configured to apply the plurality of transmission torque transmitting devices.

A system for controlling operation of such a vehicle is also disclosed.

The above features and advantages, and other features and advantages of the present invention are readily apparent from the following detailed description of the best mode for carrying out the invention when taken in connection with the accompanying drawings.

DETAILED DESCRIPTION

Figure 1:
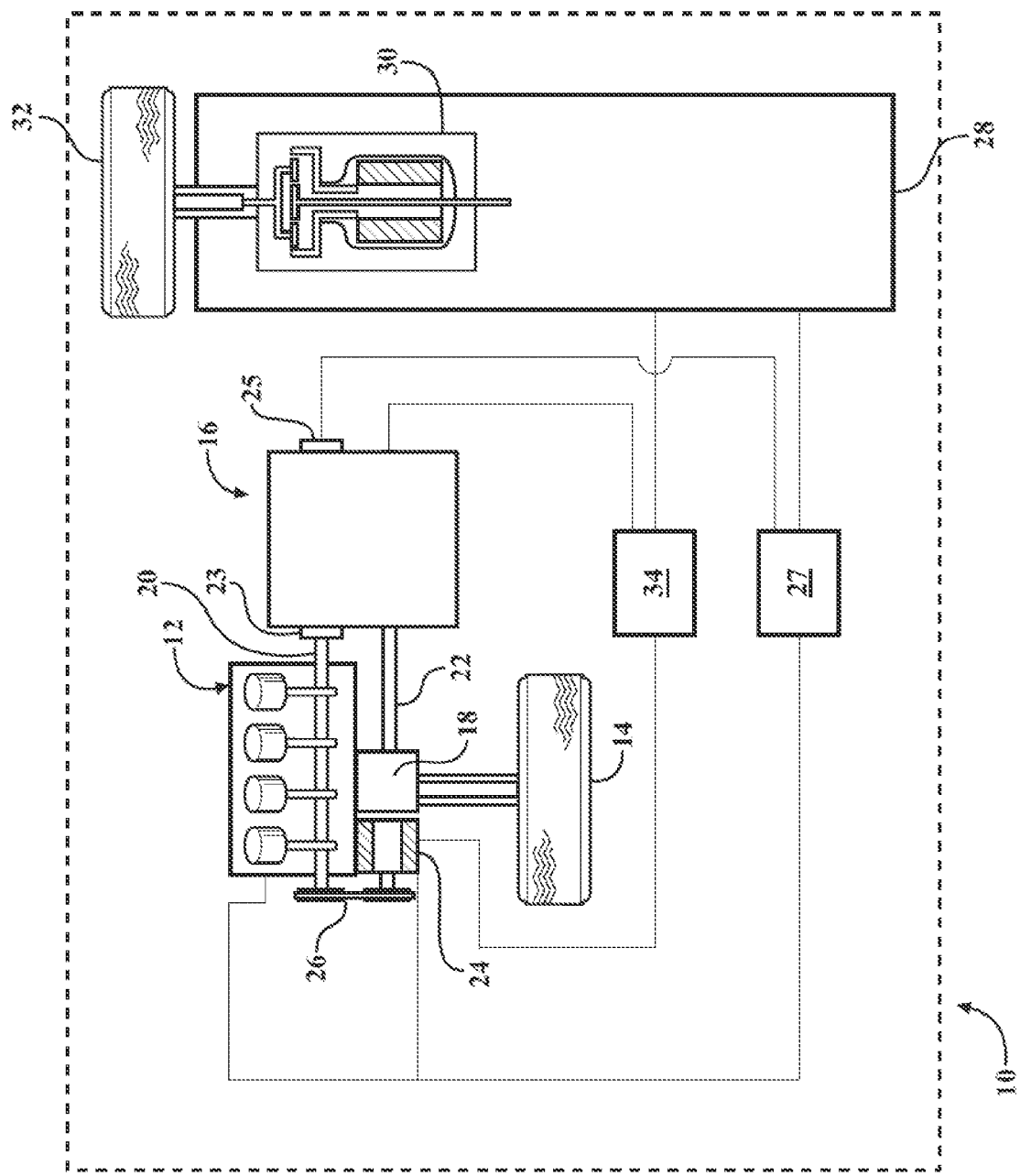
FIG. 1 is a schematic illustration of an electric all-wheel drive hybrid vehicle.

Referring to the drawings in which like elements are identified with identical numerals throughout, FIG. 1 illustrates a hybrid vehicle 10 equipped with an electric all-wheel drive system. The vehicle 10 includes an internal combustion engine 12 configured to drive the vehicle via a first set of wheels 14 through an automatic transmission 16 and a first axle 18. As contemplated herein, the automatic transmission 16 is a multi-speed automatically-shiftable transmission that utilizes a gear train and multiple torque transmitting devices to generate discrete gear ratios between an input 20 and an output 22 of the transmission.

Although not shown, the existence of various gear trains, constructed from combinations of a range of planetary gear sets, and torque transmitting devices, such as clutches and/or brakes, combined to form functional automatic transmissions will be appreciated by those skilled in the art. It is intended that the torque transmitting devices of the transmission 16 are operated via a hydraulic or fluid pressure that is generated by a fluid pump 23 that is operatively connected to the input 20 of the transmission. Accordingly, the fluid pump 23 generates fluid pressure to apply the subject torque transmitting devices when the engine 12 rotates the input 20. Additionally, an auxiliary electric fluid pump 25 is employed to pressurize or apply the torque transmitting devices in situations when the engine 12 has been shut off, but needs to be quickly restarted for driving the vehicle 10.

The automatic transmission 16 contemplated herein is a type that includes at least one specific gear ratio that requires full engagement or lock-up of a plurality of torque transmitting devices in order to select the subject gear ratio and complete a desired gear shift. An example of a transmission that requires locking up a plurality of torque transmitting devices to select a particular gear ratio is a General Motors' 6-speed automatic transmission.

The vehicle 10 also includes a first motor-generator 24. In the example embodiment, the first motor-generator 24 may be configured as an integrated starter-generator (ISG) or a 12 volt stop-start motor. The ISG contemplated herein is a 36 volt or greater motor-generator that is connected directly to the engine 12 via a belt 26 and receives its electrical energy from an energy storage device 27, such as one or more batteries. As shown, the first motor-generator 24 is used for quickly starting and spinning the engine 12 up to operating speeds as part of an engine stop-start arrangement. Additionally, the first motor-generator 24 may be used for generating electrical energy for use by accessories (not shown) of the vehicle 10, such as power steering and a heating ventilation and air conditioning (HVAC) system. As shown in FIG. 1, the energy storage device 27 also provides electrical power to operate the auxiliary fluid pump 25 to apply the torque transmitting devices in preparation for the engine 12 to be restarted by the first motor-generator 24.

The vehicle 10 additionally includes a second axle 28. The second axle 28 is operatively independent from the engine 12, the transmission 16, and the first motor-generator 24. The second axle 28 includes a second motor-generator 30 that is configured to drive the vehicle 10 via a second set of wheels 32. The second motor-generator 30 receives its electrical energy from the energy storage device 27. Accordingly, the second motor-generator 30 is configured to drive the vehicle 10 independently from the engine 12 and provides the vehicle 10 with an on-demand electric axle drive. Such driving the vehicle 10 solely via the second motor-generator 30 results in the vehicle being operated in a purely electric vehicle or "EV" mode. Furthermore, when both first and second axles 18, 28 are driven by their respective power sources, the engine 12 and the second motor-generator 30, the vehicle 10 is endowed with all-wheel drive.

The vehicle 10 may also be driven solely by the second motor-generator 30 while the engine 12 is shut off and the transmission 16 is placed in neutral in order to conserve fuel and improve the vehicle's operating the efficiency. The engine 12 may, for example, be shut off when the vehicle 10 is maintaining a steady cruising speed which may be sustained solely by the torque output of the second motor-generator 30. Additionally, the engine 12 may be shut off when the vehicle 10 is in a coast down mode, i.e., when the vehicle is decelerating from elevated speeds, or when the vehicle is stopped. In a situation when the vehicle 10 is maintaining a steady cruising speed, the engine 12 may at any moment be restarted to participate in driving the vehicle. In order to participate in driving the vehicle 10, the engine 12 will be called upon to generate an appropriate level of engine torque that will result in a desired level of transmission output torque, i.e., transmission torque at the output 22.

The desired level of transmission output torque may be representative of whether the vehicle 10 is to be driven in an electric all-wheel drive mode or in an engine-only drive mode. When the vehicle 10 is to be driven in the electric all-wheel drive mode after the engine restart, the desired level of torque is determined in response to a request generated by the vehicle's operator. When the vehicle 10 is to be driven in the engine-only drive mode, the second motor-generator 30 will need to be phased out as the engine 12 is being phased in. Such a situation may develop when the energy supplied to the second motor-generator 30 by the storage device 27 is below a predetermined threshold value that is sufficient to operate the second motor-generator. Whether the engine 12 is restarted to generate the electric all-wheel drive mode or the engine-only drive mode, the implementation of such an engine "flying start" may generate an unwanted driveline disturbance or a noise vibration and harshness (NVH) concern, and cause discomfort to occupants of the vehicle 10.

The vehicle 10 also includes a controller 34 that is responsible for accomplishing the flying start of the engine 12 and phasing in of engine torque for driving the vehicle. As envisioned herein, the controller 34 may be an electronic control unit (ECU) that is employed to regulate and coordinate the hybrid propulsion of the vehicle 10 which includes the operation of the engine 12, the transmission 16, and the first and second motor-generators 24, 30. The controller 34 is configured to receive a request for the engine to be started when the vehicle 10 is being driven solely via the second motor-generator 30. The controller 34 is also configured to control the engine 12 to generate the desired level of transmission output torque according to whether the vehicle 10 is to be driven in the electric all-wheel drive mode or in the engine-only drive mode. Additionally, the controller 34 is programmed to control the application of fluid pressure required to lock-up individual torque transmitting devices inside the transmission 16 in order to place the transmission into a particular gear ratio.

The controller 34 is also programmed to determine a desired engine speed and a gear ratio in the transmission 16 according to the desired level of transmission output torque.

For example, the desired speed of the engine 12 and the appropriate gear ratio in the transmission 16 may be selected from a table of mapped data that was gathered during testing and development of the vehicle 10. Such a table of mapped data may also be programmed into the controller 34 in order for the desired level of transmission output torque to be cross-referenced by the controller against the torque curve of the engine 12, allowable engine speeds, and transmission gear ratios at the present speed of the vehicle 10. Accordingly, the controller 34 may then select the most efficient combination of gear ratio, engine speed, and engine fueling to generate the desired level of transmission output torque for driving the vehicle 10 in response to the received request for the engine 12 to be restarted.

The gear ratio to be selected in the transmission 16 by the controller 34 for generating the transmission output torque requires locking up of a plurality of torque transmitting devices. Accordingly, the controller 34 is additionally programmed to start the engine 10 via the first motor-generator 24 for generating the desired level of transmission output torque. Additionally, the controller 34 is programmed to lock-up or fully engage all but one of a plurality of transmission torque transmitting devices required to be engaged for selecting the gear ratio. Moreover, the controller 34 is programmed to modulate the engagement of the one remaining torque transmitting device such that a torque capacity of the one remaining torque transmitting device is gradually increased. Modulation of the engagement of the one remaining torque transmitting device may be accomplished by varying pressure of the fluid that is used to actuate the device. Such modulation of the one remaining torque transmitting device serves to adjust the device's torque capacity and internal slippage, which, in turn, results in relative motion between the input 20 and output 22.

The controller 34 is also programmed to control the engine 12 to generate the desired engine speed while the engagement of the one remaining torque transmitting device is being modulated. The modulation of the engagement of the one remaining torque transmitting device may be undertaken together or substantially simultaneously with controlling the engine 12 until the desired engine speed has been generated and the speed of the output 22 is generally equal to the speed of the input 20 divided by the chosen gear ratio. Controlling the engine 12 to generate the desired engine speed may be accomplished by controlling the engine's torque output via at least one of regulating engine fuel rate, retarding engine spark, and regulating the torque of the first motor-generator 24. Typically, retarding an internal combustion engine's spark ignites the air-fuel mixture inside the engine's cylinders later in the combustion process, which tends to allow less time for the combustion to take place and reduces the engine's torque output.

The controller 34 is additionally programmed to regulate the engine 12 and the first motor-generator 24 such that combined torque input from the engine and the first motor-generator to the transmission 16 is approximately zero. Accordingly, during such regulation, the combined torque output of the first motor-generator 24 and the engine 12 is maintained at a level that is substantially equal to the torque required to spin the engine at the desired speed. The controller 34 is additionally programmed to apply the required fluid pressure to thereby lock-up the one remaining torque transmitting device and complete the selection of the chosen gear ratio. Additionally, such locking up of the one remaining torque transmitting device may be accomplished by increasing the fluid pressure to the subject device until substantially all the slip inside the device is eliminated. Therefore, the one remaining torque transmitting device is permitted to be fully locked up by the controller 34 when the engine speed has been substantially synchronized with the speed of the vehicle 10.

Furthermore, the controller 34 is programmed to control the engine 12 to generate the desired level of transmission output torque. Controlling the engine 12 to generate the desired level of transmission output torque may be accomplished via regulating engine fuel rate, advancing engine spark, and regulating the torque of the first motor-generator 24. Typically, advancing an internal combustion engine's spark ignites the air-fuel mixture inside the engine's cylinders earlier in the combustion process, which tends to allow additional time for the combustion to take place and increases the engine's torque output. Accordingly, by phasing in the engine torque to drive the vehicle 10, the controller 34 permits a flying start of the engine 12 while reducing or substantially eliminating unwanted disturbances or NVH concerns.

Figure 2:
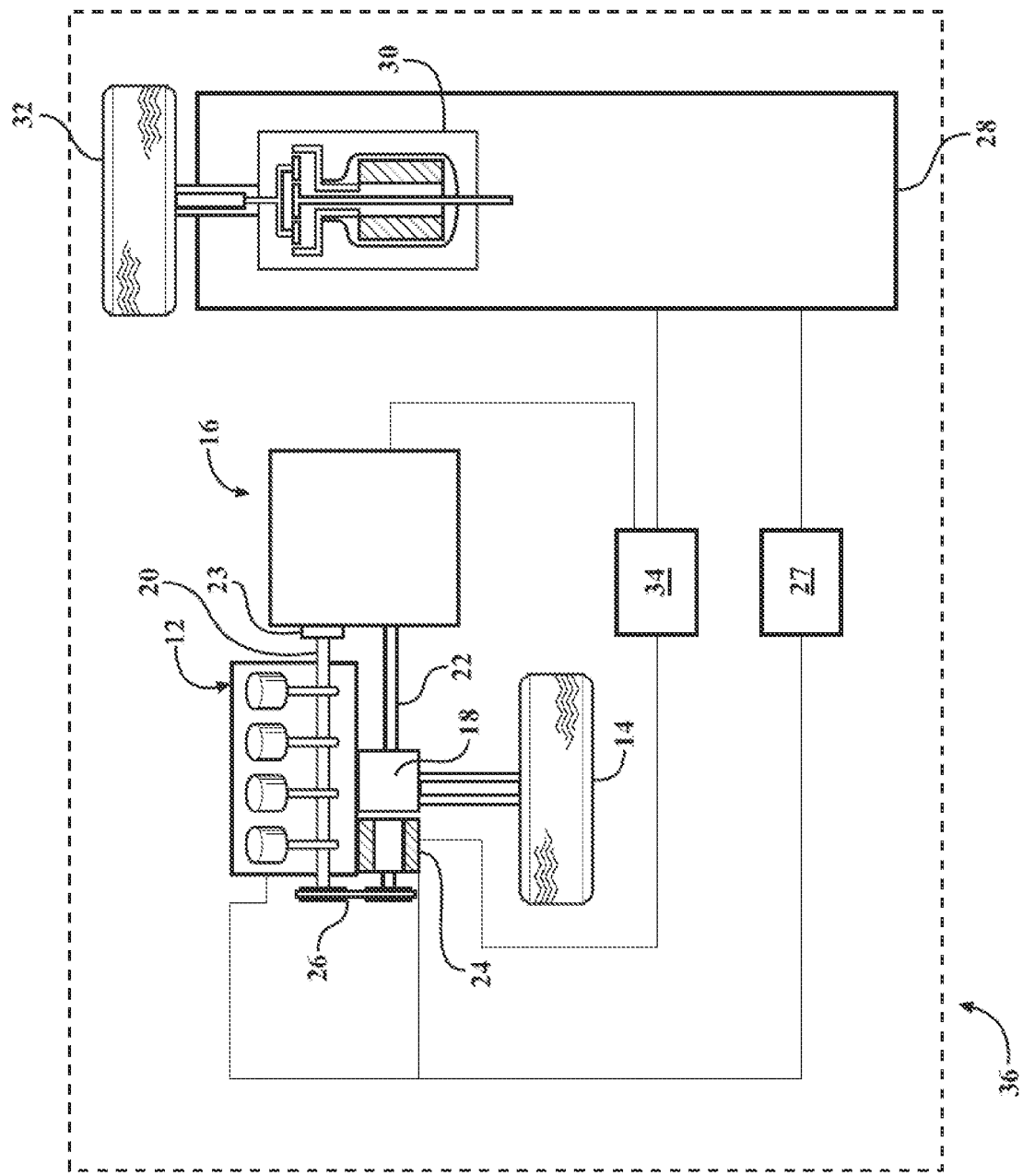
FIG. 2 is a schematic illustration of an electric all-wheel drive hybrid vehicle that includes a single fluid pump configured to apply a plurality of transmission torque transmitting devices.

FIG. 2 shows a vehicle 36 that is identical to vehicle 10 shown in FIG. 1 in all respects, other than the vehicle 36 including only the fluid pump 23, and being characterized by the absence of the auxiliary fluid pump 25. Typically, because the pump 23 is operated mechanically by the engine 12, when the engine is shut off, the auxiliary fluid pump 25 is needed to apply the plurality of torque transmitting devices in preparation for launching the vehicle 36 by the engine or to perform the engine flying start. In the vehicle 36, however, the controller 34 may be programmed to regulate the second motor-generator 30 to launch the vehicle without any assistance from the engine 12. Furthermore, right before and during the time when the vehicle 36 is being launched by the second motor-generator 30, the first motor-generator 24 may be regulated to start the engine 12, prime the fluid pump 23, and apply the torque transmitting devices. Therefore, by the time engine torque is needed to assist the second motor-generator 30 in driving the vehicle 36, the torque transmitting devices have already been applied. Accordingly, the auxiliary fluid pump 25 is not required by the vehicle 36, and permits the vehicle to include only a single fluid pump 23 that is configured to apply the plurality of transmission torque transmitting devices in the transmission 16.

Figure 3:
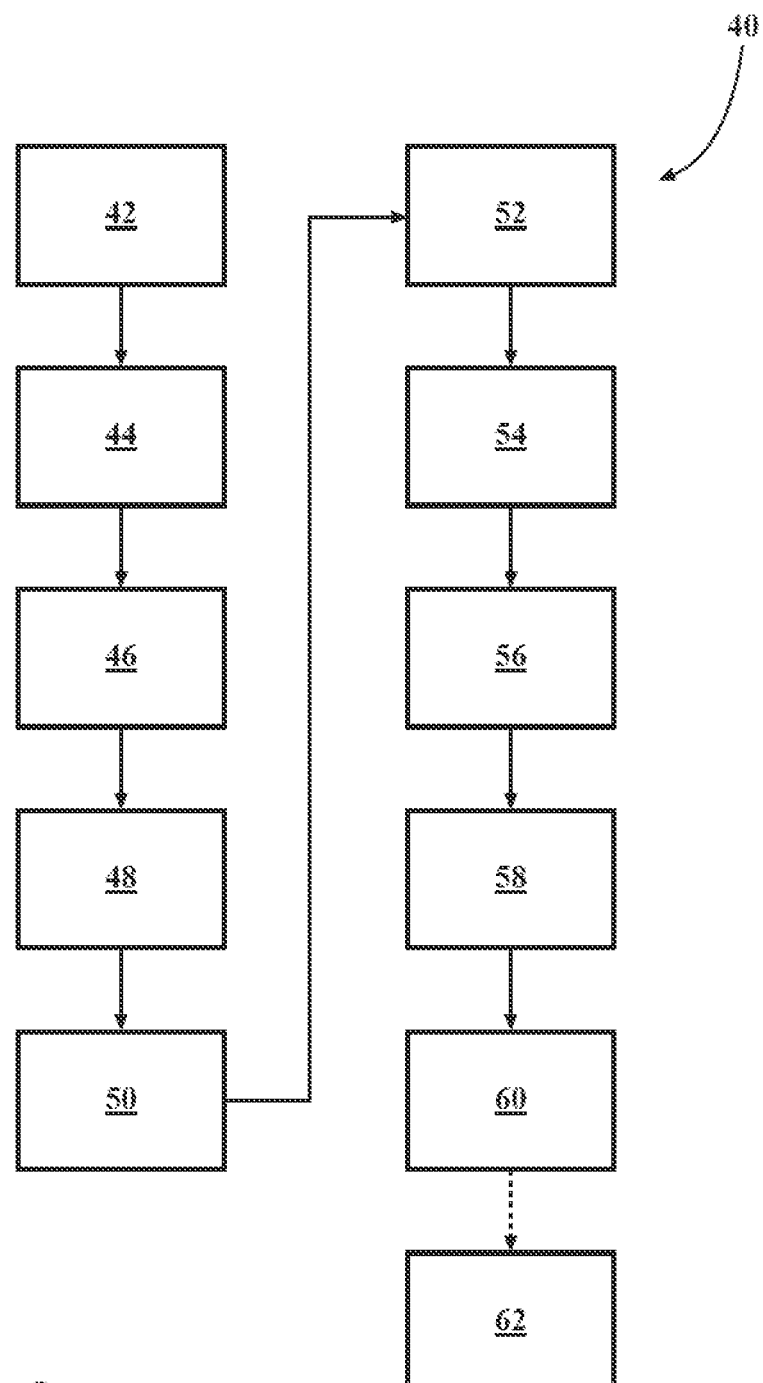
FIG. 3 schematically illustrates, in flow chart format, a method of controlling operation of the electric all-wheel drive hybrid vehicles shown in FIGS. 1 and 2.

FIG. 3 depicts a method 40 of controlling operation of the electric all-wheel drive hybrid vehicle 10 described above with respect to FIG. 1 and the vehicle 36 described above with respect to FIG. 2. Method 40 commences in frame 42 with driving the vehicle 10 in the "EV" mode solely via the second motor-generator 30, and then proceeds to frame 44. In frame 44, the method includes receiving by the controller 34 a request for the engine 12 to be started and commence generating a desired level of output torque in the transmission 16. Following frame 44, the method advances to frame 46, where the method includes determining by the controller 34 a desired engine speed and a gear ratio in the transmission 16 according to the desired level of transmission output torque.

After the desired engine speed and the gear ratio are determined in frame 46, the method proceeds to frame 48, where the method includes starting the engine 12 via the first motor-generator 24 for generating the desired level of transmission output torque. As noted above, the first motor-generator 24 may be an integrated starter-generator (ISG) that, besides being configured to start the engine 12, is configured to operate various accessories of the vehicle 10. Following frame 48, in frame 50 the method includes locking up all but one of a plurality of transmission torque transmitting devices within the transmission 16. As described above with respect to FIG. 1, every one of the plurality of transmission torque transmitting devices is required to be engaged for selecting the gear ratio in the transmission 16.

Following frame 50, the method advances to frame 52, where the method includes modulating the engagement of the one remaining torque transmitting device of the devices that are required to be engaged for selecting the chosen gear ratio by the controller 34. As described above with respect to FIG. 1, modulating of the engagement of the one remaining torque transmitting device is performed to gradually increase the torque capacity of the subject device. Following frame 52, the method proceeds to frame 54, where the method includes controlling the engine 12 to generate the desired engine speed while the engagement of the one remaining torque transmitting device is being modulated. According to the method, the modulation of the one remaining torque transmitting device in frame 52 may be performed in combination with the controlling of the engine 12 in frame 54 until the desired engine speed has been generated and the speed of the output 22 is generally equal to the speed of the input 20 divided by the chosen gear ratio.

Following frame 54, the method advances to frame 56. In frame 56, the method includes regulating the engine 12 and the first motor-generator 24 such that combined torque input from the engine and the first motor-generator to the transmission is approximately zero. After frame 56, the method moves on to frame 58, where the method includes locking up the one remaining torque transmitting device to select the chosen gear ratio. As described above with respect to FIG. 1, the locking up of the one remaining torque transmitting device may involve increasing the fluid pressure to the subject device until substantially all the slip inside the device has been eliminated. After the one remaining torque transmitting device has been locked up, the method proceeds to frame 60, where the method includes controlling the engine 12 to generate the desired level of output torque in the transmission 16.

According to the method, the controlling of the engine 12 to generate the desired level of transmission output torque may be accomplished via at least one of regulating engine fuel rate, advancing engine spark, and regulating the torque of the first motor-generator. Additionally, as described above with respect to FIG. 1, the controlling of the engine 12 to generate the desired level of transmission output torque may be accomplished for driving the vehicle 10 in the electric all-wheel drive mode or for driving the vehicle in the engine-only drive mode.

Following frame 60, the method may proceed to frame 62, where it includes phasing out the second motor-generator 30 while the engine 12 is being controlled to generate the desired level of transmission output torque if the vehicle 10 is to be operated in the engine-only drive mode. As noted above with respect to FIG. 1, the phasing out of the second motor-generator 30 may be accomplished when the energy supplied to the second motor-generator by the energy storage device 27 is below a predetermined value.

Upon completion, the method 40 accomplishes a flying start of the engine 12 while reducing or substantially eliminating an unwanted disturbance or NVH concern from the engine torque being introduced to drive the vehicle 10.

While the best modes for carrying out the invention have been described in detail, those familiar with the art to which this invention relates will recognize various alternative designs and embodiments for practicing the invention within the scope of the appended claims.

The invention claimed is:

1. A method of controlling operation of an electric all-wheel drive hybrid vehicle having an internal combustion engine configured to drive the vehicle via a first set of wheels through an automatic transmission, a first motor-generator configured to start the engine, and a second motor-generator configured to drive the vehicle via a second set of wheels, the method comprising:
   driving the vehicle solely via the second motor-generator while the engine is off;
   receiving a request for the engine to be started for generating a desired level of transmission output torque;
   determining a desired engine speed and a gear ratio in the transmission according to the desired level of transmission output torque;
   starting the engine via the first motor-generator for generating the desired level of transmission output torque;
   locking up all but one of a plurality of transmission torque transmitting devices required to be engaged for selecting the gear ratio;
   modulating the engagement of the one remaining torque transmitting device of the plurality of torque transmitting devices such that a torque capacity of the one remaining torque transmitting device is gradually increased;
   controlling the engine to generate the desired engine speed while the engagement of the one remaining torque transmitting device is being modulated;
   regulating the engine and the first motor-generator such that combined torque input from the engine and the first motor-generator to the transmission is approximately zero;
   locking up the one remaining torque transmitting device to select the gear ratio; and
   controlling the engine to generate the desired level of transmission output torque.

2. The method of claim 1, wherein the first motor-generator is configured as one of an integrated starter-generator (ISG) and a 12 volt stop-start motor.

3. The method of claim 1, wherein said controlling the engine to generate the desired engine speed is accomplished by controlling engine torque via at least one of regulating engine fuel rate, retarding engine spark, and regulating the torque of the first motor-generator.

4. The method of claim 1, wherein said controlling the engine to generate the desired level of transmission output torque is accomplished via at least one of regulating engine fuel rate, advancing engine spark, and regulating the torque of the first motor-generator.

5. The method of claim 1, wherein said controlling the engine to generate the desired level of transmission output torque is accomplished to drive the vehicle in an electric all-wheel drive mode.

6. The method of claim 1, wherein said controlling the engine to generate the desired level of transmission output torque is accomplished to drive the vehicle in an engine-only drive mode.

7. The method of claim 6, further comprising phasing out the second motor-generator while the engine is being controlled to generate the desired level of transmission output torque in the engine-only drive mode.

8. The method of claim 7, wherein the vehicle includes an energy storage device configured to supply energy to the second motor-generator, and said comprising phasing out the second motor-generator is accomplished when the energy supplied to the second motor-generator by the energy storage device is below a predetermined value.

9. The method of claim 7, wherein the vehicle includes a controller configured to receive the request for the engine to be started for generating a desired level of transmission output torque, and wherein the controller is programmed to execute each of said determining the desired engine speed and the gear ratio in the transmission, starting the engine via the first motor-generator, locking up all but one of a plurality of torque transmitting devices, modulating the engagement of the remaining one torque transmitting device, controlling the engine to generate the desired engine speed, regulating the engine and the first motor-generator such that combined torque input from the engine and the first motor-generator to the transmission is approximately zero, locking up the remaining torque transmitting device, controlling the engine to generate the desired level of transmission output torque, and phasing out the second motor-generator.

10. The method of claim 1, wherein the vehicle includes a single fluid pump regulated by the controller, and wherein each of said locking up all but one of apply the plurality of transmission torque transmitting devices and said modulating and locking up the one remaining torque transmitting device is accomplished via the fluid pump.

11. A system for controlling operation of an electric all-wheel drive hybrid vehicle, the system comprising:
an internal combustion engine configured to drive the vehicle via a first set of wheels through an automatic transmission, wherein the transmission includes a plurality of torque transmitting devices required to be engaged for selecting a gear ratio;
a first motor-generator configured to start the engine;
a second motor-generator configured to drive the vehicle via a second set of wheels;
a controller configured to receive a request for the engine to be started when the vehicle is being driven solely via the second motor-generator, to control the engine to generate a desired level of transmission output torque, and configured to:
determine a desired engine speed and a gear ratio in the transmission according to the desired level of transmission output torque;
start the engine via the first motor-generator for generating the desired level of transmission output torque;
lock up all but one of a plurality of transmission torque transmitting devices required to be engaged for selecting the gear ratio;
modulate the engagement of the one remaining torque transmitting device of the plurality of torque transmitting devices such that a torque capacity of the one remaining torque transmitting device is gradually increased;
control the engine to generate the desired engine speed while the engagement of the one remaining torque transmitting device is being modulated;
regulate the engine and the first motor-generator such that combined torque input from the engine and the first motor-generator to the transmission is approximately zero;
lock up the one remaining torque transmitting device to select the gear ratio; and
control the engine to generate the desired level of transmission output torque.

12. The system of claim 11, wherein the first motor-generator is configured as one of an integrated starter-generator (ISG) and a 12 volt stop-start motor.

13. The system of claim 11, wherein the controller is configured to control the engine to generate the desired engine speed by controlling engine torque via at least one of regulating engine fuel rate, retarding engine spark, and regulating the torque of the first motor-generator.

14. The system of claim 11, wherein the controller is configured to control the engine to generate the desired level of transmission output torque via at least one of regulating engine fuel rate, advancing engine spark, and regulating the torque of the first motor-generator.

15. The system of claim 11, wherein the desired level of transmission output torque is for driving the vehicle in an electric all-wheel drive mode.

16. The system of claim 11, wherein the desired level of transmission output torque is for driving the vehicle in an engine-only drive mode.

17. The system of claim 16, wherein the controller is additionally programmed to phase out the second motor-generator while the engine is being controlled to generate the desired level of transmission output torque in the engine-only drive mode.

18. The system of claim 17, further comprising an energy storage device configured to supply energy to the second motor-generator, wherein the second motor-generator is phased out when the energy supplied to the second motor-generator by the energy storage device is below a predetermined value.

19. The system of claim 11, wherein the vehicle includes a single fluid pump configured to apply the plurality of transmission torque transmitting devices.

20. An electric all-wheel drive hybrid vehicle comprising:
an internal combustion engine configured to drive the vehicle via a first set of wheels through an automatic transmission, wherein the transmission includes a plurality of torque transmitting devices required to be engaged for selecting a gear ratio;
a first motor-generator configured to start the engine;
a second motor-generator configured to drive the vehicle via a second set of wheels;
a controller configured to receive a request for the engine to be started when the vehicle is being driven solely via the second motor-generator, to control the engine to generate a desired level of transmission output torque, and configured to:
determine a desired engine speed and a gear ratio in the transmission according to the desired level of transmission output torque;
start the engine via the first motor-generator for generating the desired level of transmission output torque;
lock up all but one of a plurality of transmission torque transmitting devices required to be engaged for selecting the gear ratio;
modulate the engagement of the one remaining torque transmitting device of the plurality of torque transmitting devices such that a torque capacity of the one remaining torque transmitting device is gradually increased;
control the engine via retarding engine spark to generate the desired engine speed while the engagement of the one remaining torque transmitting device is being modulated;
regulate the engine and the first motor-generator such that combined torque input from the engine and the first motor-generator to the transmission is approximately zero;
lock up the one remaining torque transmitting device to select the gear ratio; and
control the engine via advancing engine spark to generate the desired level of transmission output torque.

* * * * *